United States Patent [19]

Davis

[11] Patent Number: 4,492,052

[45] Date of Patent: Jan. 8, 1985

[54] FOLDING FISHING NET

[76] Inventor: Bennie I. Davis, 6149 Belmore SW., Olympia, Wash. 98502

[21] Appl. No.: 464,679

[22] Filed: Feb. 7, 1983

[51] Int. Cl.³ .............................................. A01K 77/00
[52] U.S. Cl. .................................................... 43/12
[58] Field of Search ..................................... 43/12, 11

[56] References Cited

U.S. PATENT DOCUMENTS

| 1,169,311 | 1/1916 | Walter | 43/12 |
|---|---|---|---|
| 1,184,466 | 5/1916 | Loomis | 43/12 |
| 1,524,957 | 2/1925 | Sundberg | 43/12 |
| 2,040,714 | 5/1936 | Smith | 43/12 |
| 2,354,942 | 8/1944 | Chapman | 43/12 |
| 2,457,922 | 1/1949 | Robinson | 43/12 |
| 2,539,563 | 1/1951 | Baloun | 43/12 |
| 2,556,650 | 6/1951 | Hicks | 43/12 |
| 2,579,748 | 12/1951 | Matthews | 43/12 |
| 2,683,321 | 7/1954 | Faber | 43/12 |
| 2,738,608 | 3/1956 | Buzzini | 43/12 |
| 2,939,239 | 6/1960 | Hoffman | 43/12 |
| 3,318,035 | 5/1967 | Hovland | 43/12 |
| 3,670,444 | 6/1972 | Dieterich | 43/12 |
| 3,715,829 | 2/1973 | Hamilton | 43/12 |

FOREIGN PATENT DOCUMENTS 486263  9/1952  Canada ..................................... 43/12

*Primary Examiner*—Gene P. Crosby
*Attorney, Agent, or Firm*—Roy E. Mattern, Jr.

[57] ABSTRACT

A folding fishing net having a foldable rim and handle is conveniently and compactly carried folded in a holster at one's hip during stream fishing. When a fish is caught, the fist net, using only one hand is unfolded quickly when the fish is ready to be netted. During its quick one handed rotating to unfurl the netting and continued quick one handed sequential unfolding around two orthogonal axes, pivotal joints of the folding fish net at four locations are utilized. After the unfurling of the netting, during the first unfolding from the compacted non use position, a then longitudinally positioned divided handle, pivotally connected by a then horizontally arranged piano style hinge, and a central rim pivot joint on the folded rim, presently located closely opposite the handle, are both pivoted downwardly at the same time, through 180° around a first then horizontally positioned rotational axis. Thereafter, two rim pivot joints on opposite sides of the foldable rim are pivoted about a horizontal rotational axis perpendicular to the first rotational axis, to enable the rim to be unfolded from its half size up and over through 180° to full circle size, thereby supporting a full circular draping net which is passed under a fish. The divided handle, when fully open, via its piano style hinge, backs against itself to prevent further rotational movement. When a fisherman continues to grip the open handle, refolding of the net is prevented, without relying on any locking means. During this rapid one handed deployment of the folded fish net into a fully opened net, biasing springs are relied upon to snap the rim into its circular configuration. Also extruded stops prevent further rotational movement of the components of the rim once they reach the then horizontal circular configuration as they are unfolded to support the netting for receiving a fish. The fisherman, using his other hand to guide the fishing pole is still successfully managing the hooked fish as the fish is netted.

5 Claims, 13 Drawing Figures

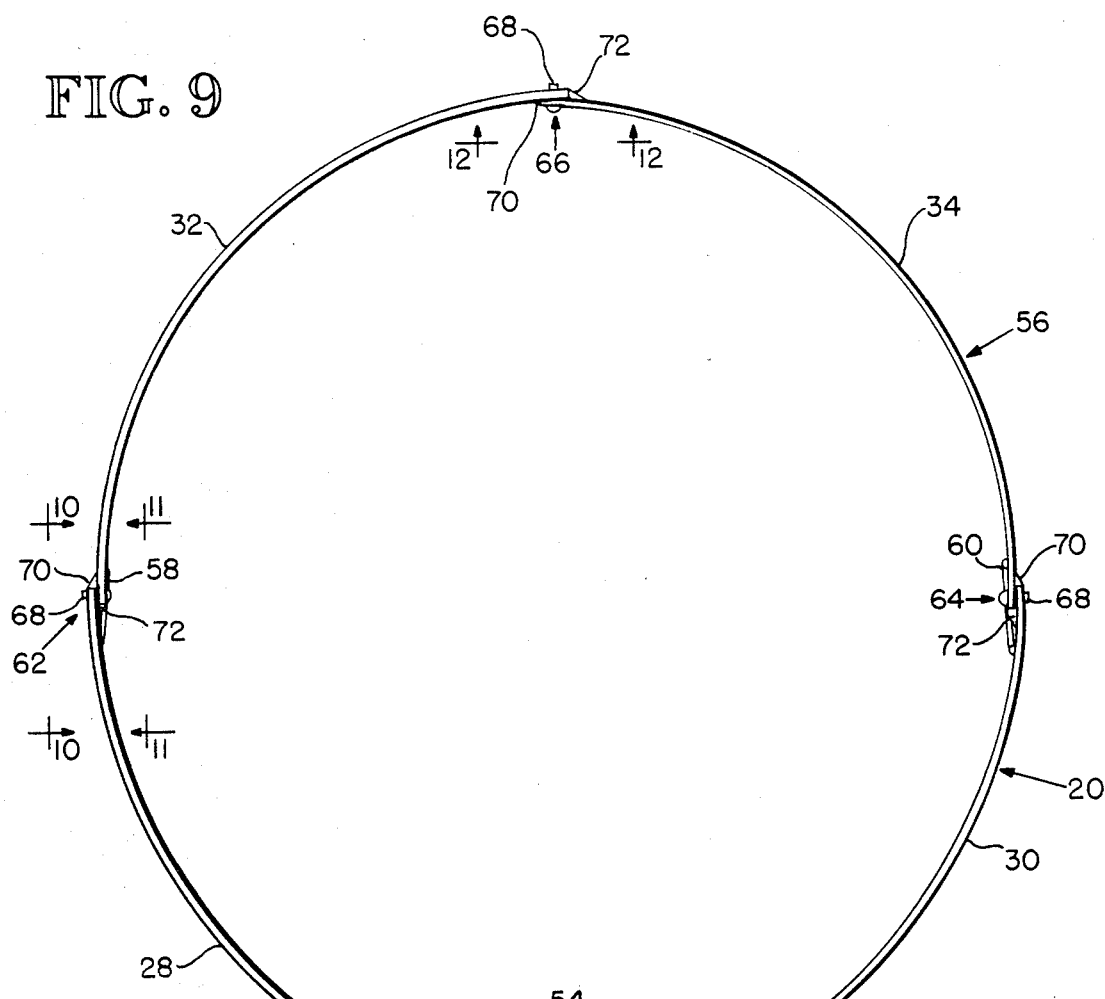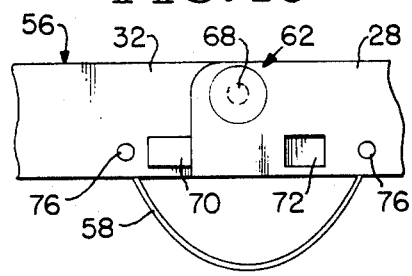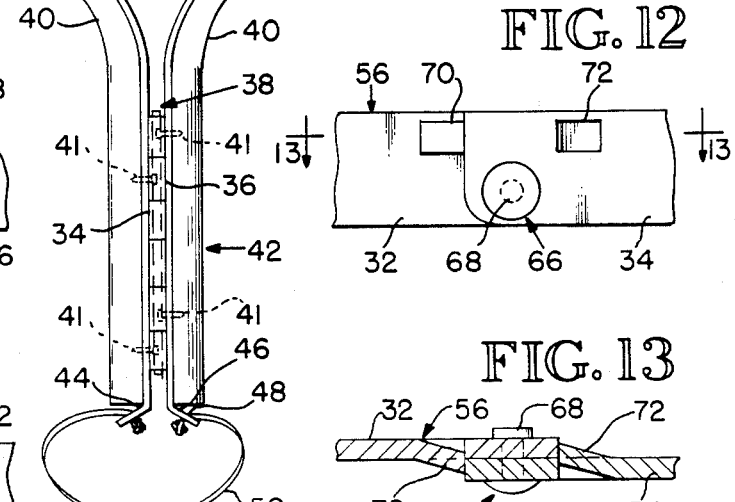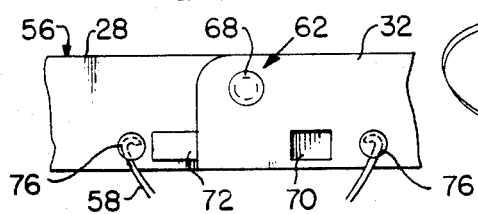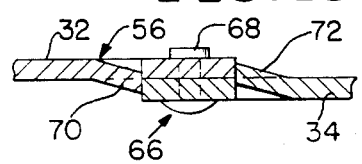

FOLDING FISHING NET

BACKGROUND OF THE INVENTION

There is a need to provide a readily accessible compacted fishing net for a stream fisherman which he may easily unfold using only one hand to permit netting the fish while he controls the fishing rod and reel with his other hand. In respect to earlier developed folding fishing nets they are believed to have failed to fully provide such a folding fish net.

Mr. Sundberg's fishing net, disclosed in his U.S. Pat. No. 1,524,957 requires three unfolding operations to open it, via six mechanically complicated pivot joints. One of its handle pivot joints requires a flex member locking means to retain itself in the opened position. Also a rim pivot joint opposite the handle has a sliding pivot joint requiring a flange for mounting. It is not apparent Mr. Sundberg's folding fishing net may be operated entirely by one hand.

Mr. Mathews' fishing net, illustrated in his U.S. Pat. No. 2,579,748 is believed to require the use of both hands when deploying the fishing net. Mr. Walter's fishing net, disclosed in his U.S. Pat. No. 1,169,311 is quite complicated and has a reduced opening for entry of a fish into the net. Mr. Hamilton's fishing net, shown in his U.S. Pat. No. 3,715,829 has a longitudinally divided handle and is simply mechanically operated. However it does not fold very compactly nor unfold to a full size circular shape. Other earlier provided fishing nets of more general interest are disclosed in: Loomis McVickar's U.S. Pat. No. 1,184,466; Mr. Chapman's U.S. Pat. No. 2,354,942; Mr. Dietrich's U.S. Pat. No. 3,670,444; and Mr. Smith's U.S. Pat. No. 2,040,714. Also U.S. Pat. Nos. 2,556,650; 2,939,239; 2,409,146; and 2,738,608; Canadian Pat. No. 486263.

SUMMARY OF THE INVENTION

When stream fishing a fisherman desires to have a fishing net conveniently at hand. Yet, when it is not needed, he or she does not want his fishing net obstructing his or her movement, nor possibly becoming entangled with clothing or equipment. This quick opening unfolding fishing net meets these desires of a fisherman, by utilizing a two orthogonal axes unfolding and folding arrangement, wherein the fishing net is unfolded from a size which is a fraction of its unfolded size, by employing a rapid one handed unfolding deployment, when a fish is to be netted. In reaching these operational objectives, the design simplicity of the folding fishing net minimizes materials cost and eliminates production difficulties, while maximizing mechanical and structural strength. This foldable fishing net also features: a longitudinally divided handle, joined by a piano style hinge, affording maximum strength and rigidity to the unfolded opened frame while the handle is gripped, keeping the depending fish netting in an opened configuration with no locking means being necessary; and springs biasing the rim components toward their open positions to facilitate their unfolding via the one handed rapid deployment of the unfolding fishing net to receive a fish down through a circular entry of the netting.

DESCRIPTION OF THE DRAWINGS

A preferred embodiment of the folding fish net is illustrated in the drawings, wherein:

FIG. 9 is an enlarged top view of only the foldable handle and the foldable frame of the fishing net, without including the netting, to particularly illustrate the structure of the handle and frame;

FIG. 10 is a partial side view of the outside of the left pivotal hinge joint of the foldable frame, taken on line 10—10 of FIG. 9;

FIG. 11 is a partial side view of the inside of the left pivotal hinge joint of the foldable frame, taken on line 11—11 of FIG. 9;

FIG. 12 is a partial view of the outside of the leading or center pivotal hinge joint of the foldable frame, taken on line 12—12 of FIG. 9; and FIG. 13 is a partial cross sectional view, taken along line 13—13 of FIG. 12 to illustrate the leading or center pivotal hinge joint, which incorporates its own abutments to stop the unfolding, when the essentially horizontal fully opened fishing net configuration is reached, such abutments being also used in the pivotal hinge joints illustrated in FIGS. 10 and 11.

DESCRIPTION OF THE PREFERRED EMBODIMENT

Figure 1:
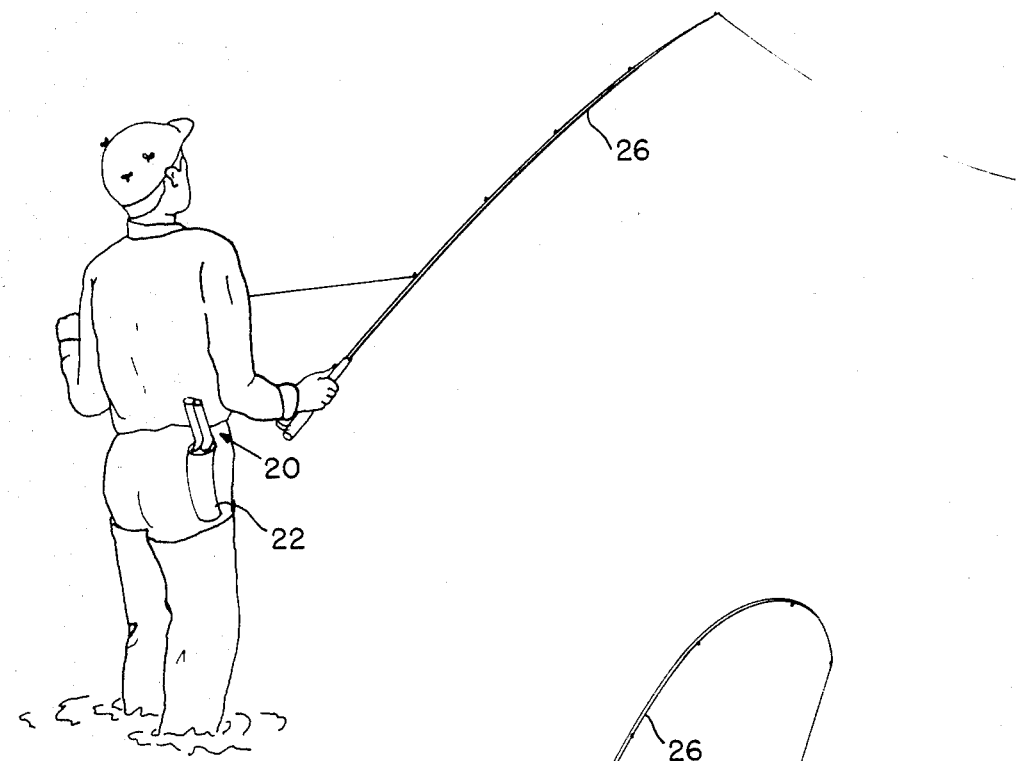
FIG. 1 illustrates a stream fisherman fishing as he carries his folded fishing net in a holster at his side.
Figure 2:
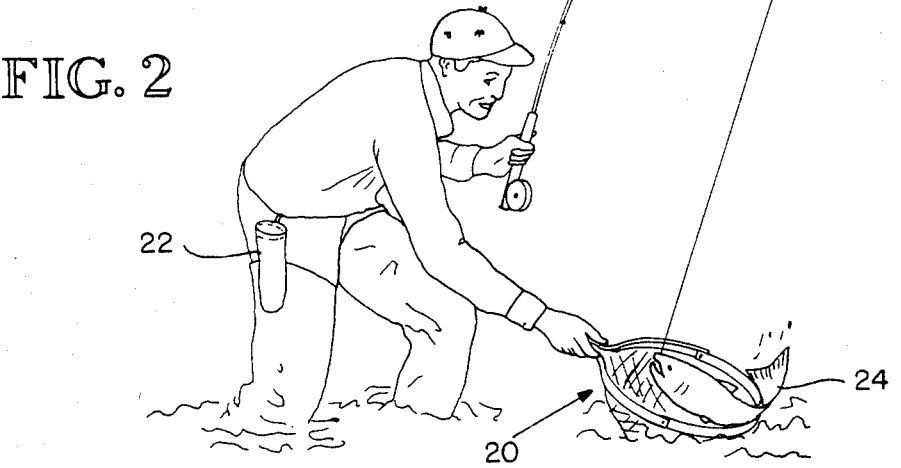
FIG. 2 shows him netting a fish holding his pole in one hand and using his other hand to guide his unfolded fishing net beneath and then up and around the fish.

As illustrated in FIG. 1, a stream fisherman carries the folded fishing net 20 in a holster 22 at his side. When he is ready to land a fish 24 he has caught, he holds the fishing pole 26 in one hand and unfolds the fishing net 20 with his other hand to net the fish 24, as shown in FIG. 2.

Figure 3:
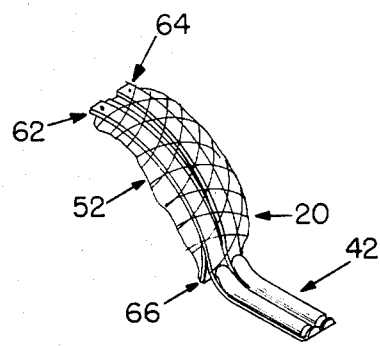
FIG. 3 illustrates the folded fishing net removed from the holster and positioned substantially horizontally with the netting still wound around the folded frame.

The one hand unfolding sequence of the initially folded fishing net 20 to arrive at the fish landing unfolded fishing net 20, is illustrated in FIGS. 3 through 8. After the removal of the folded fishing net 20 from the holster 22, it is placed essentially horizontal as shown in FIG. 3, with the folded frame members 28, 30, 32, 34 all similarly curved upwardly in a vertical plane and positioned adjacent one another. Frame members 28, 30, are reversibly curved and then straightened for joining to the opposite plates 34, 36 of a piano type hinge 38. Preferably wood pieces 40 are secured to the frame members 28, 30 to complete a handle 42. The straightened ends terminate on a bias 44, 46 and holes 48 are made at the bias locale to receive an optional cowhide loop 50 as shown only in FIG. 9.

Figure 4:
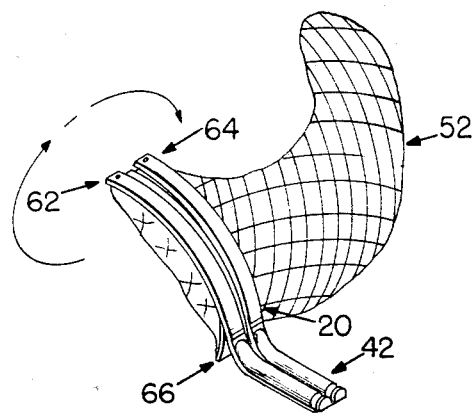
FIGS. 4 and 5 show the fishing net being oscillated in a circular motion in FIG. 4 to unwind the netting from the folded frame, reaching the position shown in FIG. 5 with the collapsed net depending from the frame.
Figure 5:
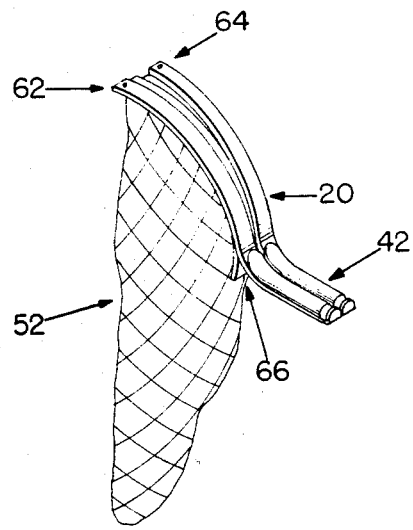

From this position shown in FIG. 3, the fisherman using one hand oscillates the folded fishing net 20 in a circular motion as illustrated in FIG. 4, by including motion arrows, to unwind the netting 52, until the closed netting hangs below the frame members 28, 30, 32, 34, as shown in FIG. 5. Then, the fisherman using one hand allows the compression spring 54 to assist him in pivoting the handle 42 portions about the piano hinge 38, whereby the frame members 28, 32 pivot or rotate together to the left and the frame members 30, 34 pivot or rotate together to the right, as all the frame members essentially reach a substantially horizontal plane, as illustrated in FIG. 6.

Figure 6:
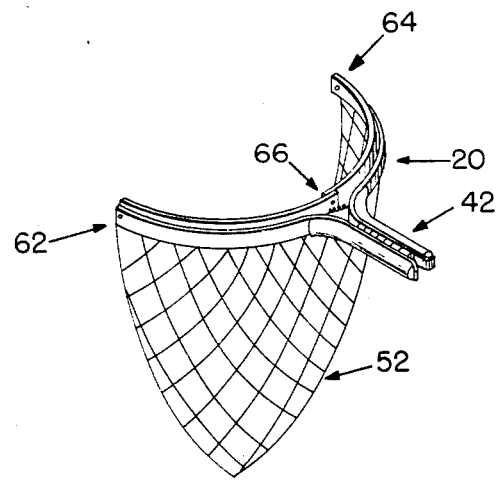
FIGS. 6, 7 and 8 illustrate the fishing net frame and netting being opened, with the first opposite rotary motions of the frame members, being shown in FIG. 6, with respect to a horizontal axis in the direction of the hinged handle, and the second rotary motion of the remaining one half of the frame members, being shown in FIG. 7, with respect to a second horizontal axis which is perpendicular to the first horizontal axis, and with the fully opened fishing net being illustrated in FIG. 8.
Figure 7:
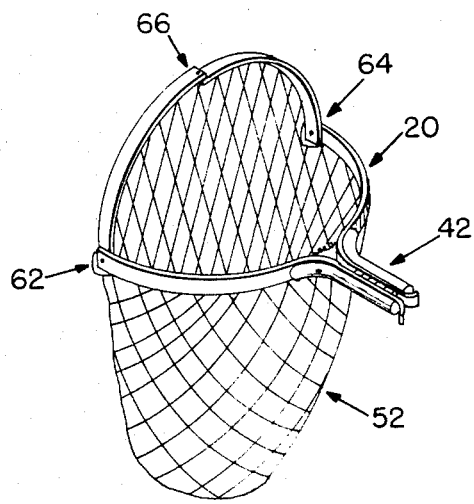
Figure 8:
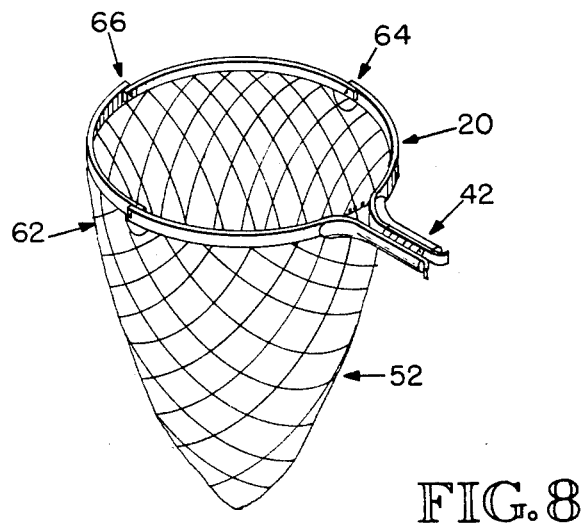

From this position, shown in FIG. 6, the fisherman, still using only one hand, i.e. the same hand, as his other hand holds the fishing pole 26, uses an oscillatory flipping motion to rotate frame members 32, 34, to complete the opening of the overall frame or rim 56 with the aid of the forces of like tension springs 58, 60, as illustrated in FIGS. 7 and 8. The netting 52 is then fully opened to receive the fish 24 as the overall frame or rim 56 is passed under the swimming hooked fish 24.

In FIGS. 9 through 13, the preferred specific constructions of the three hinge joints 62, 64, 66, utilizing rivet pins 68 and integral abutments 70, 72, are illustrated. The left pivotal hinge joint 62 is illustrated in FIGS. 9, 10, and 11, inclusive of the tension spring 58 secured by fasteners 76. Integral abutments 70, 72 are made by bending out portions of the foldable overall frame or rim 56, as illustrated in FIG. 13. The right pivotal hinge joint 64 is shown only in FIG. 9. It is arranged similary to the left pivotal hinge joint 62.

The leading or center pivotal hinge joint 66 of the foldable overall frame or rim 56 is shown in FIGS. 9, 12 and 13. It is arranged similarly to the left pivotal hinge joint 62; however, no tension spring is utilized, for compression spring 54 is active along this horizontal axis determined by the axis of the handle 42. The tension spring 58, 60 are active along the left to right horizontal axis which is perpendicular to the horizontal axis determined by the axis of the handle 42.

In the open unfolded position of the fishing net 20, the plates 34, 36 of the piano hinge 38 abut one another back to back and are so held by the hand of the fisherman, against the return force of the compression spring 54, otherwise operable along this longitudinal axis. So long as the hand grip is maintained the opened net is stable firmly supports the netted fish.

Once the fishing net 20 is in this opened unfolded position the tension springs 58, 60 keep the folded frame members 32, 34 rotated around the transverse axis against the respective abutments 70, 72 and in the same horizontal plane of the folded frame members 28, 30. The resulting opened positions of these frame members 28, 30, 32, and 34, present a circular rim or overall frame 56 to support the netting 52.

After the fish is intentionally removed from the netting, the folding fishing net 20 is folded by reversing the directions of the one hand motions in the reverse sequence. The folded fishing net 20 is then ready for reentry into the holster 22, where it is placed until quickly needed again.

In reference to the loop 50 on the handle 42, it is draped downwardly when the fish net 20 is folded and in the holster 22. When the fishing net 20 is to be removed from the holster 22, the fisherman preferably first slips his or her hand through the loop 50, so the loop will be placed around his or her wrist. Thereafter the fisherman removes the fishing net 20 from the holster 22. In this way, the fishing net 20 will not be unwantedly completely dropped. Also if a fish 24 is about to be netted, but then the fish 24 decides to make another run in the stream or lake, the fisherman may then release his or her hand from the handle 42 to again operate the reel on the fishing rod 26, without completely dropping or losing the fishing net 20, for it is again held by the loop 50 which is around the fisherman's wrist.

I claim:

1. A folding fishing net, unfoldable by the motions of one hand of a stream fisherman creating a circular rim supporting a depending netting, via rotations about a longitudinal axis passing through the center of a handle and about a transverse axis passing through the center of the opening created by the circular rim, comprising:

(a) a circular rim having four frame members, two of these frame members of opposite hand forming the one half of the circular rim nearest a handle and arranged for joining a handle, and equipped with hinge portions at a transverse axis, and two of these frame members of opposite hand forming the one half of the circular rim farthest from the handle, and arranged with hinge portions at a transverse axis and there pivotally joined with other frame members, and arranged with hinge portions to be pivotally joined together along a horizontal axis passing through the center of both the handle and the opening provided by the circular rim;
    (b) a two piece handle having a longitudinal axis hinge, with respective pieces of the handle secured to the respective opposite hand frame members of the circular rim;
    (c) a netting threaded about the circular rim and depending therefrom creating a fish surrounding net; and
    (d) a compression spring installed between the pieces of the handle where the opposite hand frame members first join the handle pieces, whereby the force of this compression spring aids in the rotation about the longitudinal axis of this fishing net from the folded position to the unfolded position.

2. A folding fishing net, as claimed in claim 1, wherein the rotation about the transverse axis from the folded position to the unfolded position is aided by spring forces, tension springs being installed between the frame members about their joined hinge portions which are operable about the transverse axis.

3. A folding fishing net, as claimed in claim 2, wherein the two frame members forming the one half of the circular rim nearest the handle are extended longitudinally adjacent the pieces of the handle and adjacent the longitudinal hinge of the handle and are secured to both the pieces of the handle and to the longitudinal hinge.

4. A folding fishing net, as claimed in claim 3, wherein the pivotal hinges joining the opposite hand frame members at the transverse axis and at the longitudinal axis are stopped from pivoting farther once reaching the opened horizontal position of the circular rim, as abutments are provided on the circular rim at these pivotal hinges.

5. A folding fishing net, as claimed in claim 4, wherein the longitudinal axis hinge is a piano hinge, and the plates thereof abut one another to stop the travel, when the circular rim is fully opened in a horizontal plane.

* * * * *